(12) United States Patent
Wild et al.

(10) Patent No.: US 11,391,466 B2
(45) Date of Patent: Jul. 19, 2022

(54) COOKING APPLIANCE, IN PARTICULAR COMMERCIAL COOKING APPLIANCE

(71) Applicant: Convotherm-Elektrogeräte GmbH, Eglfing (DE)

(72) Inventors: Hannes Wild, Riegsee (DE); Stan Smits, Weilheim (DE); Herbert Fischhaber, Peißenberg (DE)

(73) Assignee: WELBILT DEUTSCHLAND GMBH, Herborn (DE)

( * ) Notice: Subject to any disclaimer, the term of this patent is extended or adjusted under 35 U.S.C. 154(b) by 387 days.

(21) Appl. No.: 16/136,971

(22) Filed: Sep. 20, 2018

(65) Prior Publication Data

US 2019/0093900 A1    Mar. 28, 2019

(30) Foreign Application Priority Data

Sep. 22, 2017  (DE) .......................... 102017216855.2
Feb. 5, 2018    (DE) .......................... 102018201743.3

(51) Int. Cl.
*F24C 7/08*    (2006.01)
*H04N 5/225*   (2006.01)
*F24C 15/04*   (2006.01)

(52) U.S. Cl.
CPC .............. *F24C 7/085* (2013.01); *F24C 15/04* (2013.01); *H04N 5/2252* (2013.01); *H04N 5/2253* (2013.01)

(58) Field of Classification Search
CPC ....... F24C 15/04; F24C 7/085; H04N 5/2252; H04N 5/2253

(Continued)

(56) References Cited

U.S. PATENT DOCUMENTS 4,077,389 A * 3/1978 Vogel .................... F24C 15/021
                                                                126/190
4,122,323 A * 10/1978 Staats ..................... H05B 6/763
                                                                219/741

(Continued)

FOREIGN PATENT DOCUMENTS

DE        19705697 A1    6/1998
DE    202011002570 U1    5/2012

(Continued)

OTHER PUBLICATIONS

European Search Report dated Feb. 14, 2019 for European application No. 18195705.1.

*Primary Examiner* — Dana Ross
*Assistant Examiner* — Joseph W Iskra
(74) *Attorney, Agent, or Firm* — Ohlandt, Greeley, Ruggiero and Perle, LLP (57) ABSTRACT

A cooking appliance, in particular to a commercial cooking appliance with a housing, with a cooking chamber that is arranged in the housing and that has a cooking chamber opening that is surrounded by a circumferential door seal that is arranged at the door inner side and/or a housing area adjacent to the cooking chamber opening and that can be opened and closed by a cooking chamber door, wherein the cooking chamber door has an inner pane that is adjacent to the cooking chamber and that, in the closed state of the cooking chamber door, abuts a door seal as well as an outer pane that is arranged at a distance to the inner pane and that together with the inner pane delimits a cooking chamber door interior space, and with an optoelectronic sensor, wherein, in the closed state of the cooking chamber door, the optoelectronic sensor projects into a reception area of the cooking chamber door interior spaces arranged outside the door seal.

19 Claims, 10 Drawing Sheets

(58) Field of Classification Search
USPC .......................................................... 99/341
See application file for complete search history.

(56) References Cited

U.S. PATENT DOCUMENTS

| | | | | | |
|---|---|---|---|---|---|
| 4,255,640 | A | * | 3/1981 | Bressler | H05B 6/6414 126/190 |
| 4,880,955 | A | * | 11/1989 | Nitzinger | A21B 3/10 219/758 |
| 5,664,862 | A | * | 9/1997 | Redmond | G02B 6/001 362/293 |
| 6,070,998 | A | * | 6/2000 | Jennings | B60Q 1/2669 362/100 |
| 7,252,402 | B2 | * | 8/2007 | Gotz | F24C 15/008 362/89 |
| 8,003,923 | B2 | * | 8/2011 | Wilsdorf | A47L 15/4293 219/506 |
| 8,563,059 | B2 | * | 10/2013 | Luckhardt | A47J 37/00 426/233 |
| 10,022,614 | B1 | * | 7/2018 | Tran | G16H 50/70 |
| 2006/0049188 | A1 | * | 3/2006 | Gramlich | F24C 15/04 219/723 |
| 2006/0266347 | A1 | * | 11/2006 | Gramlich | F24C 15/008 126/39 BA |
| 2011/0149551 | A1 | * | 6/2011 | Camarillo Fernandez | F24C 15/008 362/92 |
| 2012/0160830 | A1 | * | 6/2012 | Bronstering | H05B 6/763 219/620 |
| 2015/0285512 | A1 | * | 10/2015 | Matarazzi | F24C 7/085 99/341 |
| 2015/0330640 | A1 | * | 11/2015 | Stork Genannt Wersborg | F24C 7/08 99/332 |
| 2017/0000292 | A1 | * | 1/2017 | Park | H04N 5/2257 |
| 2017/0208652 | A1 | * | 7/2017 | Luckhardt | H04N 7/183 |
| 2017/0261213 | A1 | * | 9/2017 | Park | F24C 7/085 |
| 2017/0329125 | A1 | * | 11/2017 | Churovich | G01K 1/14 |
| 2019/0093900 | A1 | | 3/2019 | Wild et al. | |
| 2019/0124250 | A1 | * | 4/2019 | Wolf | A61B 1/0008 |

FOREIGN PATENT DOCUMENTS

| | | |
|---|---|---|
| DE | 102013114230 A1 | 6/2015 |
| EP | 2515044 A1 | 10/2012 |
| EP | 2520169 A1 | 11/2012 |
| EP | 3460336 A1 | 3/2019 |
| JP | 2008304132 A | 12/2008 |
| WO | 20030081285 A2 | 10/2003 |
| WO | 2005077556 A1 | 8/2005 |
| WO | 20160128372 A1 | 8/2016 |
| WO | 2018153690 A1 | 8/2018 |

* cited by examiner

COOKING APPLIANCE, IN PARTICULAR COMMERCIAL COOKING APPLIANCE

CROSS-REFERENCED APPLICATIONS

This application claims priority to Germany Patent Applications Nos. 102017216855.2, filed on Sep. 22, 2017, and 102018201743,3, filed on Feb. 5, 2018, both of which are incorporated by, reference hereto in their entireties.

BACKGROUND

1. Field of the Disclosure

The disclosure relates to a cooking appliance, in particular the form of a commercial cooking appliance.

2. Discussion of the Background Art

Such a cooking appliance is known from EP 2 520 169 A1 in the form of an oven. In this cooking appliance, a camera is arranged in the cooking chamber door of the cooking chamber to take pictures of the items to be cooked that are located inside the cooking chamber and to be able to provide these images to a user.

The technical problem of this cooking appliance is that, due to being positioned in the cooking chamber door between an inner pane and an outer, pane, the camera can be overheated through the heat radiation of the cooking chamber.

Therefore, the known cooking appliance is preferably provided with a plurality of cooling devices which can comprise cooling elements, heat insulation material and cooling channels as well as a partition wall.

Thus, the disadvantage of this arrangement is that a plurality of additional technical measures have to be taken in order to avoid overheating of the camera arranged in the cooking chamber door so as to be able to avoid the mentioned overheating.

As a further disadvantage, it is to be stressed that the attachment of cooling bodies at one or multiple door panels can render it harder to detect items to be cooked inside the interior cooking chamber and in front of the cooking appliance.

What is known from DE 20 2011 002 570 U1 is a device for thermal processing of food items having at least one sensor for detecting the type of product and for the placement of products on a product carrier. This sensor is arranged in front of the cooking chamber door outside the cocking chamber above the cooking chamber door. Alternatively, it is possible to assign a sensor to each insertion plane, with the sensor then being connected to the control via a corresponding data transmission line.

What is further known from DE 10 2013 114 230 A1 is a cooking appliance with a flow channel being provided on its top side, inside of which an optical system, such as for example a camera, can be arranged.

It is an object of the present disclosure to provide a cooking appliance which makes it possible to observe items to be cooked inside the cooking chamber and to observe items to be cooked before they are inserted into the cooking chamber outside of the same, and namely in a manner that is technically simple.

SUMMARY

Due to the fact that, in the closed state of the cooking chamber door, the optoelectronic sensor of the cooking appliance according to the disclosure is arranged inside a reception area of the cooking chamber door that is provided outside of the door seal, there is the advantage that the already provided door seal can be used as a thermal shield for the optoelectronic sensor and that a part of the cooking chamber door interior space, which is also already provided, can be used as a reception area for the sensor, so that, with the cooking appliance according to the disclosure, it is not necessary to provide any additional cooling appliances to avoid overheating of the optoelectronic sensor. Further, there is the advantage that an air flow occurs between the inner pane and the outer pane, which can be used as a cooling flow for the optoelectronic sensor, without additional cooling appliances being necessary for this purpose. With regards to that, the content of the disclosure of DE 10 2004 020 181 is included in its entirety in the content of the disclosure of the present disclosure by reference.

This has the advantage that, with the cooking appliance according to the disclosure, it is possible to realize a so-called stacked kit in which the cooking appliances can be arranged on top of each other.

Further, there is the advantage of an esthetic design, since no attachment parts have to be affixed.

Further, the optoelectronic sensor can capture the cooking chamber as well as the area in front of the cooking chamber, and thus it is possible to observe the items to be cooked inside the cooking appliance as well as the items to be cooked that are still to be loaded. This results in the further advantages of a higher process reliability and a better quality by the provision of core temperature data.

Further, an automated documentation of the processes inside the oven and an easier compliance with hygiene requirements, such as for example the "hygiene lights", HACCP, can be achieved.

Further, it is possible to realize a simplified product traceability by image documentation and a shortening of training times for new operating staff.

As a further advantage, it is to be mentioned that, with the cooking appliance according to the disclosure, it becomes possible to carry out documentation and monitoring of the loaded item, of the cooking process, and of the cooking results.

As a further advantage, it is to be stressed that with the cooking appliance according to the disclosure no cable in the cooking chamber door is needed, which would nave to be guided through hinges, which, for one thing, could result in damage to the cables and in addition provides the advantage that the construction according to the disclosure is considerably more cost-effective than that of constructions in which cables have to be placed inside the door.

Further, there is the advantage of an easier maintenance in the service case.

Finally, with the cooking appliance according to the disclosure, a documentation of the state of the cooking chamber with regard to contamination and hygiene as well as a monitoring of the cooking process in the cooking appliance can be realized in real time.

Finally, it is possible to minimize operational errors in this manner.

In a further particularly preferred embodiment of the cooking appliance according to the disclosure, the generation of a directed air flow is possible at the end of the cooking program. The directed air flow which is discharged from the gap of the slightly opened cooking chamber door is created by a rotational movement of the cooking chamber fan. Here, it is preferred that the air flow is guided depending on the situation according to the respectively present conditions. Here, influencing factors can be the type and size of the appliance, the cooking chamber climate, such as e.g. temperatures and vapor saturation, the loading quantity, and insert positions of the trays, as well as the door gap size.

The control variables for creating a directed air flow can be the following influencing factors.

rotational direction and rotational speed of the fan as well as its arrangement inside the cooking chamber (lateral or adjacent to the back wall);

acceleration and/or braking curves;

lead times before the end of the cooking program as well as deflection geometries and positioning, for example of the deflector plates or deflector sheets;

Optionally, also movable parts can be provided, or door locking systems with closed venting positions of the cooking chamber door can be provided.

Thanks to the above-mentioned measures it is possible to direct the generated air flow in such a way that a camera that may for example be attached at the or in the cooking appliance does not get dirty, or that the air flow is optionally guided into an extractor hood that is attached on the device. In addition, in a further particularly preferred embodiment, it is possible that the hot vapor that is discharged at the end of the cooking program does not flow in the direction towards the operating staff, but instead is discharged into a safe area above the cooking appliance.

Here, the device controller can be preferably designed in such a manner that, as the cooking chamber door is opened, for example into a venting position, the fan is not immediately switched off but keeps being operated over a certain follow-up time so that the directed flow of the vapor to be dissipated can be created, preferably through interaction with the flow-guiding device. Such a follow-up time of the fan can be implemented in the device software.

Through these measures, it is preferably possible to avoid undefined air or vapor flows at the end of a cooking program, which partially can occur through external air flows (extractor hood technology, opened windows of the installation room, etc.) that are present at the installation location.

BRIEF DESCRIPTION OF THE DRAWINGS

Further details, advantages and features of the present disclosure follow from the following description of the exemplary embodiments based on the drawing. Herein.

DETAILED DESCRIPTION OF THE PREFERRED EMBODIMENT

Before the principles of the present disclosure are addressed in detail, it is to be understood that what is understood by the term "cooking appliance" within the context of this application are commercial cooking appliances as well as household cooking appliances, and in total very generally food treatment appliances that can perform cold as well as hot processing of food items, and can for example include hot-air steamers, combi steamers, beverage venting machines, drink mixers, microwave appliances, and other food treatment appliances.

Figure 1:
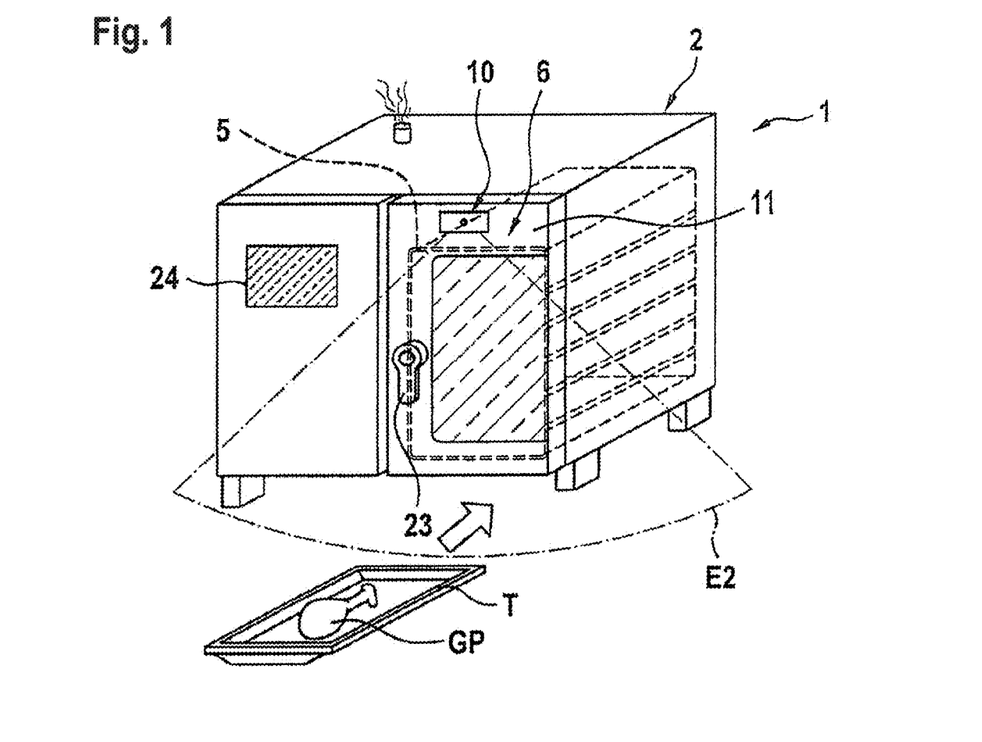
FIG. 1 shows a strongly schematically simplified perspective view of a first embodiment of the cooking appliance according to the disclosure with a closed cooking chamber door.

FIG. 1 shows, in a strongly schematically simplified depiction, a cooking appliance 1 according to the disclosure that has a housing 2. Inside the housing 2, a cooking chamber 3 is arranged, which can be seen in FIG. 2 and which has a cooking chamber opening 4 that can also be seen in the depiction of FIG. 2 with the cooking chamber door 6 opened. The cooking chamber opening 4 can be opened and closed by means of the cooking chamber door 6, for example to insert an GP item to be cooked, which is arranged on a tray T for items to be cooked, into the cooking chamber 3 or to take it out of the cooking chamber 3 following the cooking process.

Figure 2:
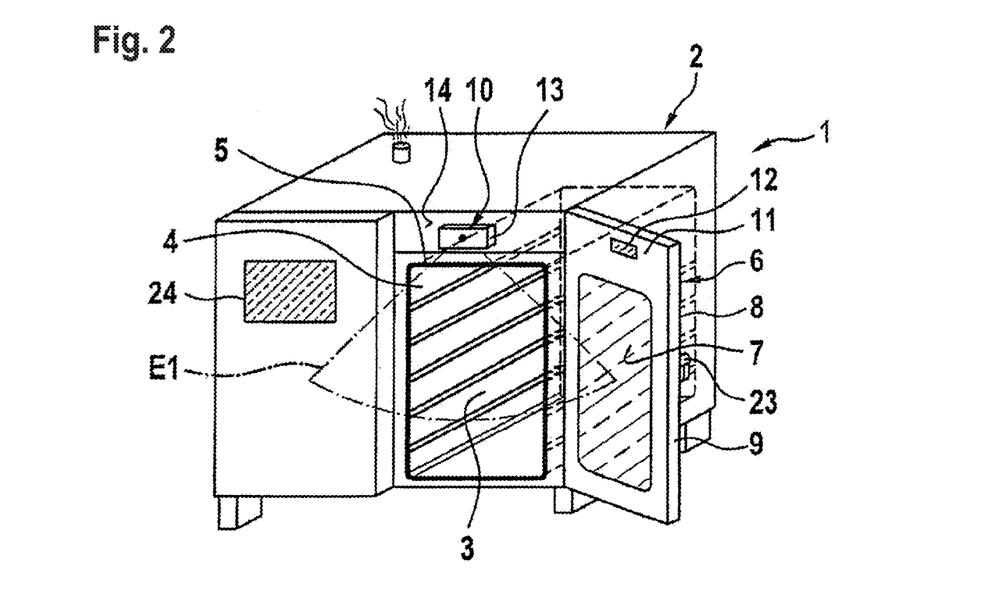
FIG. 2 shows a view corresponding to FIG. 1, with the cooking chamber door opened.

FIGS. 1 and 2 further illustrate the arrangement of a door seal 5, which is a door seal that circumferentially extends about the four sides of the cooking chamber opening 4, which can in particular be seen in the depiction of FIG. 2 with the cooking chamber door 6 opened. In the shown exemplary case, the door seal 5 is arranged on a housing area that is adjacent to the cooking chamber opening 4. Alternatively, the door seal 5 can also be attached at the door inner side.

As can further be seen from FIG. 21 the cooking chamber door 6 has an inner pane 7 that is adjacent to the cooking chamber 3 and that abuts the door seal 5 in the closed state of the cooking chamber door 6. Further, the cooking chamber door 6 has an outer pane 8 that is arranged at a distance from the inner pane 7 and that together with the inner pane 7 delimits a cooking chamber door interior space 9.

The first embodiment of the cooking appliance 1 according to the disclosure according to FIGS. 1 and 2 further has an optoelectronic sensor 10 that is schematically shown in a strongly simplified manner and that, in the closed state of the cooking chamber door 6 according to FIG. 1, is arranged inside a reception area 11 of the cooking door interior space 9 arranged outside of the door seal 5. Since the cooking chamber door 6 is closed in FIG. 5, here the door seal 5 is illustrated with a dashed line, while in FIG. 2 it can be seen in its totality as the described circumferential door seal 5 since the cooking chamber door 6 is in its opened state, wherein FIG. 1 as well as FIG. 2 illustrate that, due to the depiction chosen in these Figures, in this case the sensor 10 is arranged above the door seal 5, so that the door seal 5, which represents an already provided structural component, can function as a thermal shield for the sensor 10 that is arranged in the reception area 11.

The reception area 11 can further be provided with an inspection window 12, which can be seen in FIG. 2 since this Figure illustrates the opened state of the cooking chamber door 6, as mentioned. The inspection window 12 can be non-reflecting on its inner surface to avoid reflections. The outer surface of the inspection window 12 can be color-matched to the surrounding sheets of the door frame of the cooking chamber door. In the embodiment according to FIGS. 1 and 2, the optoelectronic sensor 10 is arranged on a housing projection 13 that is attached on the housing front face 14 and projects from the same, that is, that projects into an area in front of the entire front side of the cooking appliance 1. Through this arrangement, when the cooking chamber door 6 is opened, the sensor 10 can cover a detection area E1 which is illustrated by the dot-dash line and within which it can detect items to be cooked that are not yet introduced into the cooking chamber 3, such as the item to be cooked or the product GP to be cooked shown in FIG. 1. When the cooking chamber door 6 is closed after the tray T for the item to be cooked with an item to be cooked arranged therein has been introduced, the sensor 10 is immersed with its housing projection 13 into the reception area 11 of the cooking chamber door interior space 9, and in this state, in which the cooking chamber 3 is heated, is protected against the heat radiation of the cooking chamber 3. Although hot air can flow over the optoelectronic sensor 10 when the cooking chamber door is opened, this is not critical in the case of the cooking appliance according to the disclosure, since this action of heat is only brief, and the hot air passes by the sensor and thus the optoelectronic sensor 10 is not subjected to significant loads.

Figure 3:
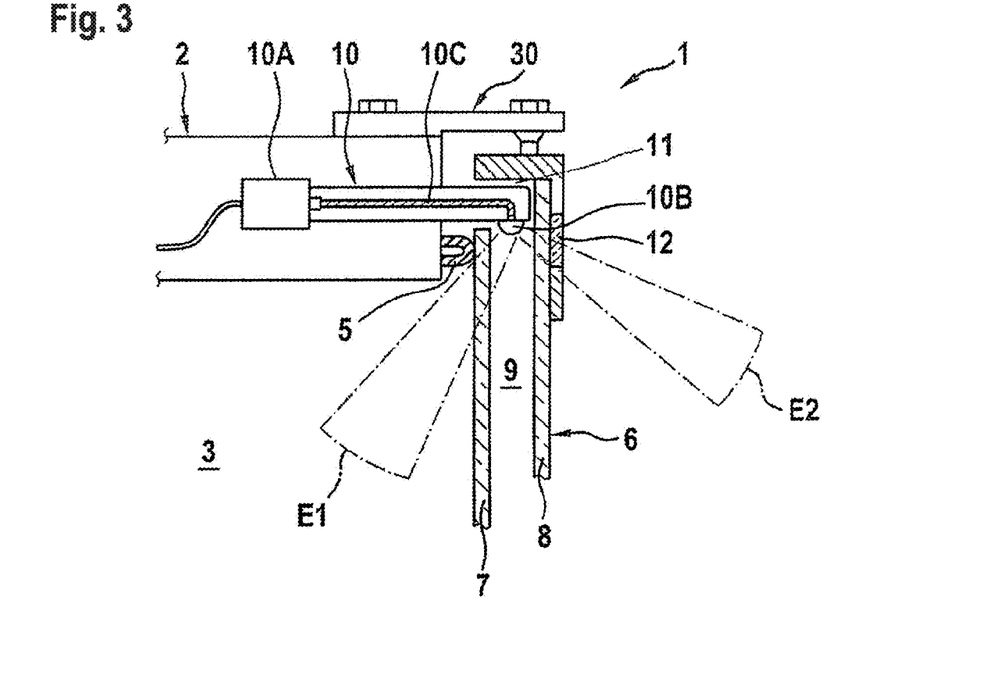
FIG. 3 shows a strongly schematically simplified, partially sectioned schematic depiction of a part of a second embodiment of the cooking appliance according to the disclosure.

FIG. 3 illustrates a second embodiment of the cooking appliance according to the disclosure 1 in a strongly schematically simplified partial depiction of the cooking appliance 1. This partially sectioned depiction initially clarifies the design of the cooking chamber door 6 that comprises the cooking chamber door interior space 9 resulting from the spatial distance between the inner pane 7 and the outer pane 8. The cooking chamber door 6 can for example be hinged at the housing 2 in a pivotable manner via a door hinge 30.

FIG. 3 illustrates the closed state of the cooking chamber door 6, in which the inner pane 7 rests on the circumferential door seal 5 in an outer edge area of the inner pane 7 on the same.

Here, FIG. 3 again illustrates that the reception area 11 of the cooking door interior space 9 is located outside of the door seal 5, so that also in this embodiment the door seal 5 can serve as a heat shield.

In the second embodiment shown in FIG. 3, an optoelectronic sensor 10 is provided, comprising a sensor housing 10A and a sensor eye 10B. Here, the sensor housing 10A is arranged in the housing 2 and outside of the cooking chamber 3, that is, in a cool area. Here, the sensor eye 10B, which may for example be an optical system in the form of an optical lens, is arranged in the reception area 11 and is also thermally shielded by the door seal 5. In the embodiment according to FIG. 3, the sensor eye 10B is connected to the sensor housing 10A via an optical cable 10C, so that the sensor housing 10A with the image capturing components arranged inside it is protected even better from a thermal load, since only the sensor eye 10B is arranged in the reception area 11. The optoelectronic sensor 10 can also be embodied as an endoscopy system. The endoscopes used here can be rigid endoscopes, flexible endoscopes, or video endoscopes. The basic components of such endoscopes are light sources, light guides, and image conductors. For this purpose, the light source has a light guide output that is connected to a light guide and leads to a light guide input at the endoscope shaft. The endoscope further has an ocular and a focus ring, in the shaft of the endoscope, glass fibers for light transmission as well as one or multiple objective lenses and one or multiple relay lenses can be arranged. For more details, the content of the Wikipedia site "https://de.wikipedia.org/wiki/endoskop" is herewith included in its entirety in the content of the disclosure of the present disclosure by reference.

Through the dot-dashed lines E1 and E2, FIG. 3 illustrates the option of monitoring the cooking chamber 3 as well as the outer area of the cooking appliance 1, as has already been explained above based on FIGS. 1 and 2.

Figure 4:
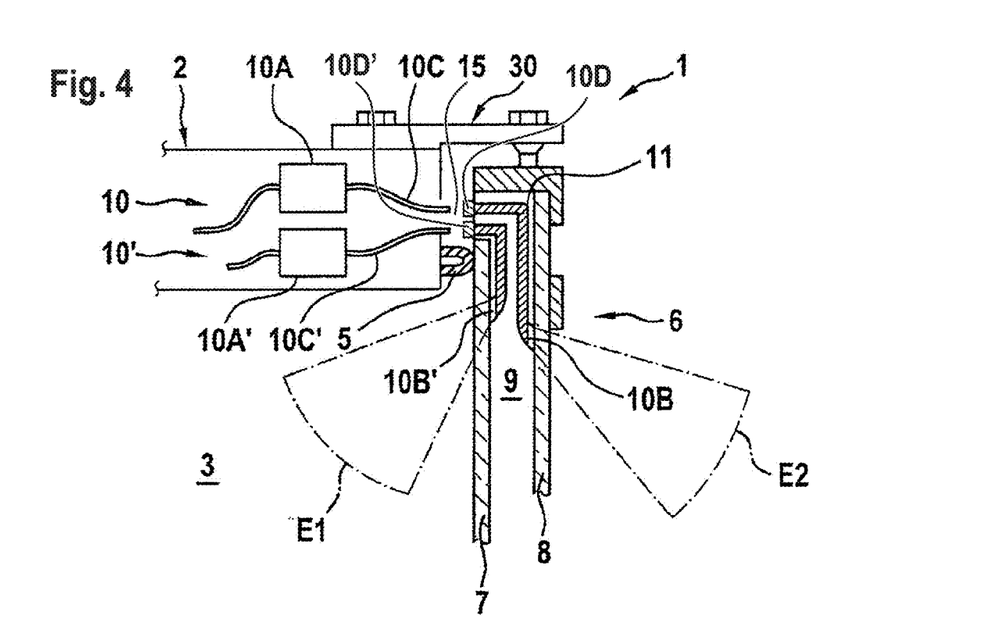
FIG. 4 shows a depiction of a third embodiment of the cooking appliance according to the disclosure corresponding to FIG. 3.

The third embodiment of the cooking appliance according to the disclosure 1 shown in FIG. 4 largely corresponds to that of FIG. 3, with the exception that in this embodiment two optoelectronic sensors 10, 10' are provided. Here, the two sensor housings 10A and 10A' are again arranged in the housing 2, that is, in a cool area of the cooking appliance 1, and are connected to sensor eyes 10B and 10B' via dedicated optical cables 10C, 10C', wherein the two optical cables 10C and 10C' end in an air gap 15 that is provided between the housing 2 and the cooking chamber door 6. Here, FIG. 4 illustrates that coupling-in optics 10D and 10D' are also arranged in the air gap opposite the ends of the optical cables 10C and 10C'. The two sensor eyes 10B and 10B' are the end points of dedicated tight-conducting bodies, wherein the sensor eye 10B rests on the inner surface of the outer pane 8, while the sensor eye 10B' rests on the inner surface of the inner pane 7, so that it creates the detection area E1 in the cooking chamber 3, while the sensor eye 10B creates the detection area E2 in the outer area of the cooking appliance 1. In this embodiment, the sensor eyes 10B and 10B' can be preferably embodied as an optical system, such as e.g. as a lens, in particular as a wide-angle lens. Although two optoelectronic sensors 10, 10' are provided in the particularly preferred embodiment of FIG. 4, it is also possible to provide only one of these two optoelectronic sensors in the previously described manner. Here, the type of the embodiment of the optical system of the cooking appliance according to the disclosure is left to the discretion of the person skilled in the art of optical systems, in particular of endoscopy systems.

Since in this embodiment the two housings 10A and 10A' are already protected from thermal overheating in a cool area of the housing 2, it is sufficient in the embodiment according to FIG. 4 that the door seal 5 protects respectively only the top parts of the two light-conducting bodies 10B and 10B' arranged in the reception area 11.

Figure 5:
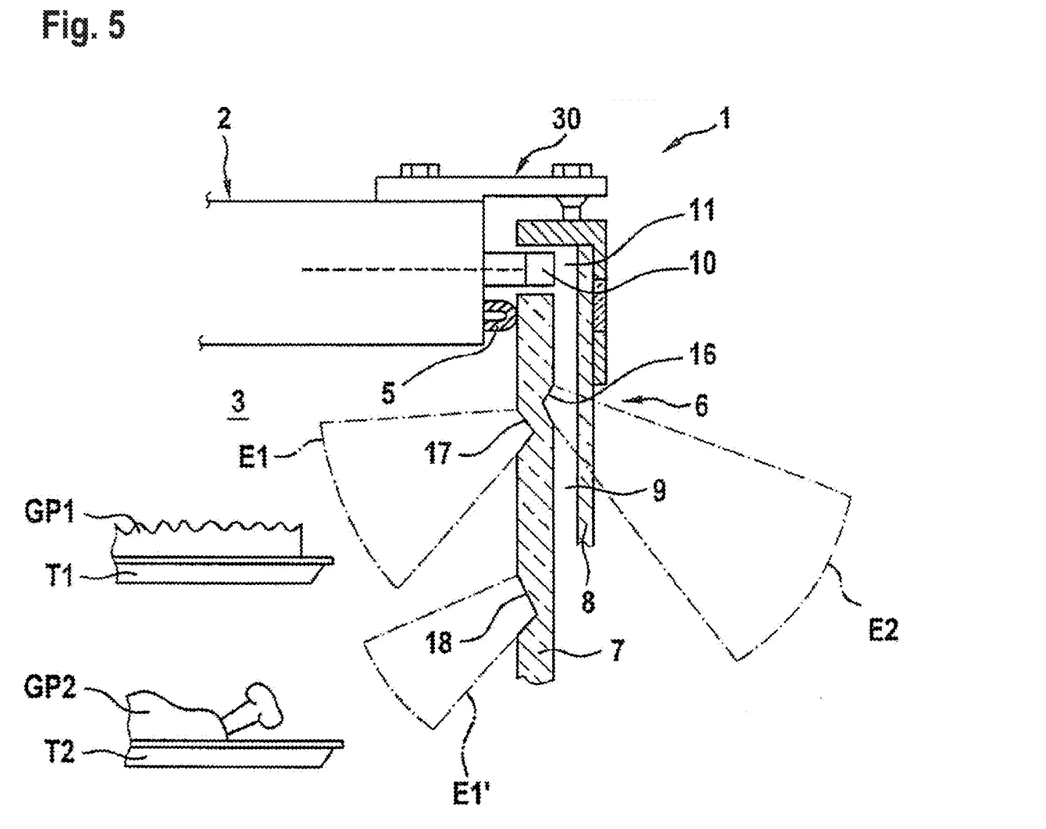
FIG. 5 shows depictions of a fourth embodiment of the cooking appliance according to the disclosure corresponding to FIGS. 3 and 4.

FIG. 5 shows a fourth embodiment of the cooking appliance 1 according to the disclosure which largely corresponds to that of FIG. 3. However, in this embodiment the optoelectronic sensor 10 is arranged inside the reception area 11 in its totality and cooperates with the inner pane 7 that is provided with optical eyes 16, 17 and 18. This results in three detection areas E1 and E1' in the cooking chamber 3 and E2 outside of the cooking appliance 1. These optical eyes 16, 17 and 18 may for example be partly ground surfaces of the inner pane 7, as can be seen from the depiction of FIG. 5.

Figure 6:
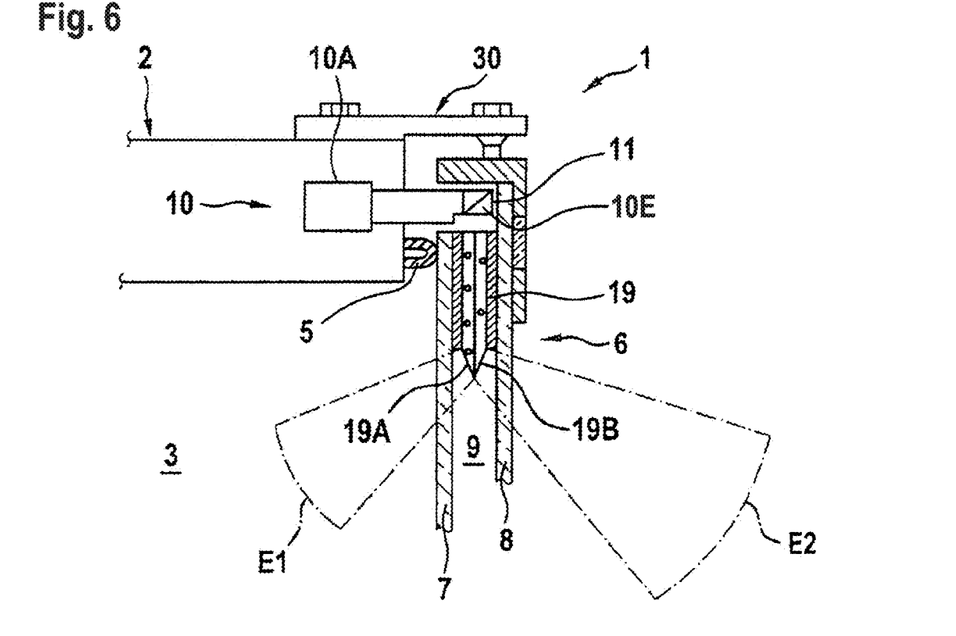
FIG. 6 shows a depiction of a fifth embodiment of the cooking appliance according to the disclosure corresponding to FIGS. 3 to 5.

FIG. 6 shows a fifth embodiment of the cooking appliance 1 according to the disclosure, which largely corresponds to that according to FIG. 3. Here, too, an optoelectronic sensor 10 is provided, with its sensor housing 10A being arranged inside the housing 2 and being in operative connection via a suitable light guiding device with the sensor eye 10B that is arranged in the reception area 11. The characteristic of this embodiment is a divided prism 19 that is arranged in the cooking chamber door interior space 9. This prism 9 has two light exit surfaces or decoupling points 19A and 19B, in the case of the decoupling point 19A being directed towards the cooking chamber 3, while the coupling-out point 19B is directed towards the outer area of the cooking appliance 1 which in turn determines the detection areas E1 or E2.

Figure 7:
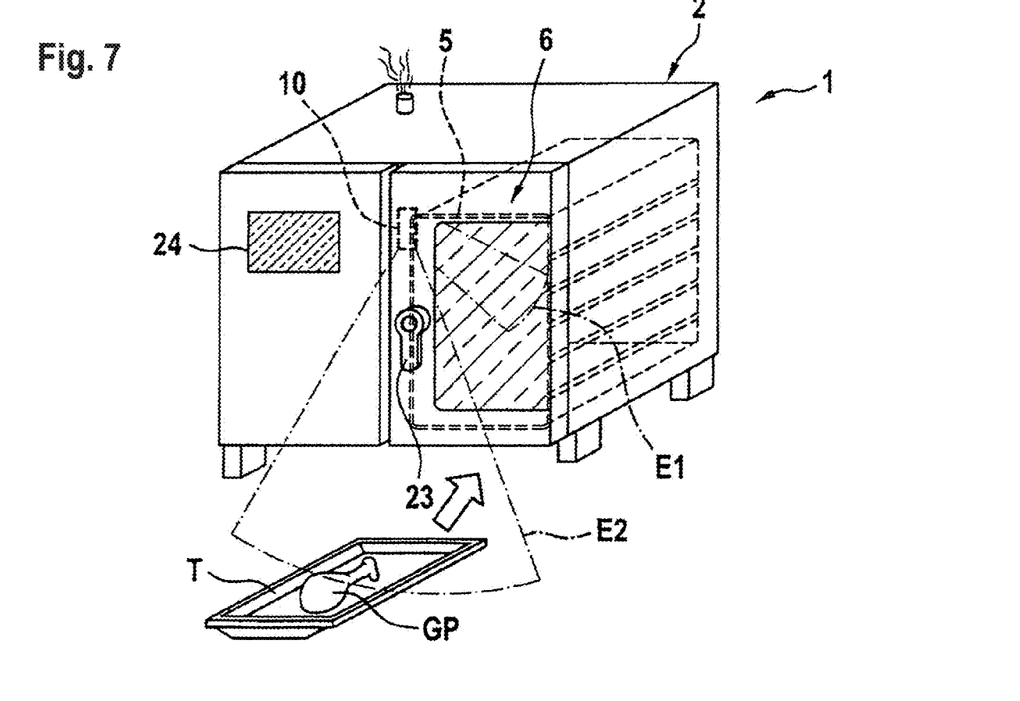
FIG. 7 shows a depiction of a sixth embodiment of the cooking appliance according to the disclosure corresponding to FIG. 1.

The sixth embodiment of the cooking appliance 1 according to the disclosure according to FIG. 7 is merely supposed to illustrate that it is not only possible to arrange the optoelectric sensor 10 above the door seal 5, but also laterally with respect to the same, like in the exemplary case on the left-hand side of the left longitudinal portion of the door seal 5, based on the depiction chosen in FIG. 7.

Figure 8:
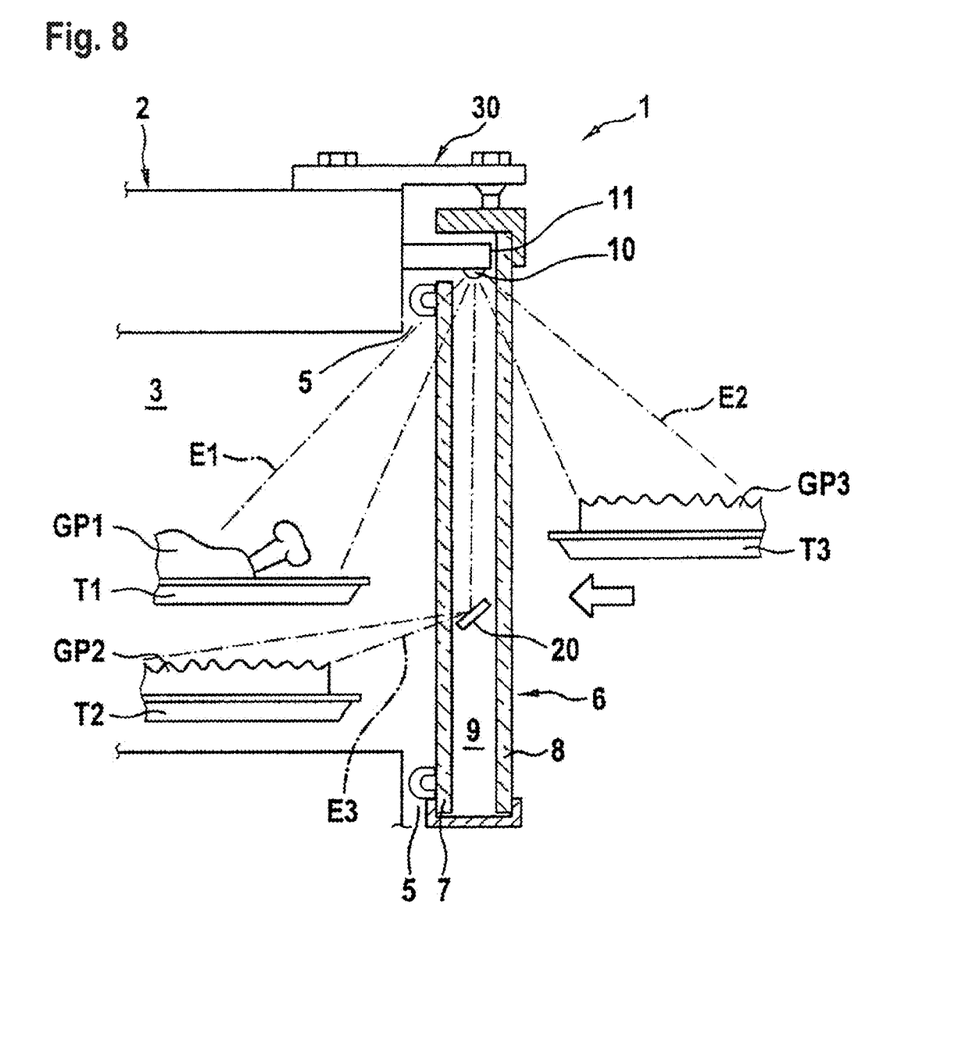
FIG. 8 shows a depiction of a seventh embodiment of the cooking appliance according to the disclosure corresponding to FIGS. 3, 4, 5 and 6.

The seventh embodiment of the cooking appliance according to the disclosure 1 according to FIG. 8 substantially corresponds to that of FIG. 3, wherein, for obtaining two detection areas E1 and E3, a deflection mirror 20 is provided in the cooking chamber 3, being arranged in the cooking chamber door interior space 9. By means of the detection area E3, this deflection mirror 20 also facilitates the detection of a product GP2 to be cooked that is arranged below the product GP1 to be cooked which is detected by detection area E1. Such a deflection mirror 20 can be formed in a planar or a spherical manner.

The optoelectronic sensor 10 provided in FIG. 8 can again be structured in the way as has been described based on FIG. 3, or it can also be a camera that is arranged in the reception area 11, which corresponds to an arrangement according to FIG. 5.

Figure 9:
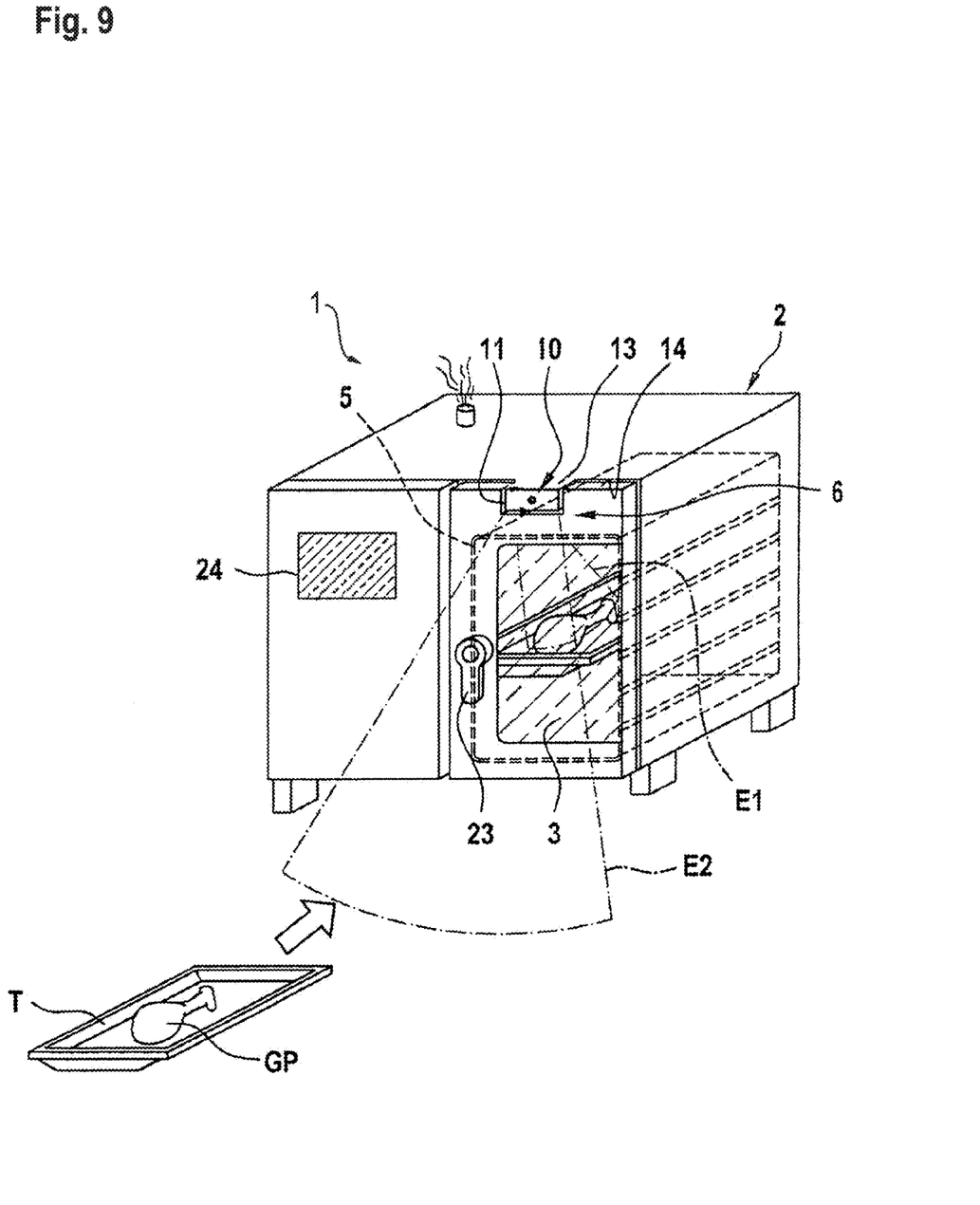
FIG. 9 shows a depiction of an eighth embodiment of the cooking appliance according to the disclosure corresponding to FIG. 1.

The eighth embodiment of the cooking appliance 1 according to the disclosure according to FIG. 9 substantially corresponds to that of FIG. 1, wherein again an optoelectronic sensor 10, for example in the form of a camera, is correspondingly arranged in the housing projection 13. In the closed state of the cooking chamber door 6, this housing projection 1 projects into the reception area 11 of the cooking chamber door interior space 9, which is open at the top in this exemplary embodiment as can be seen from the depiction of FIG. 9.

Figure 10:
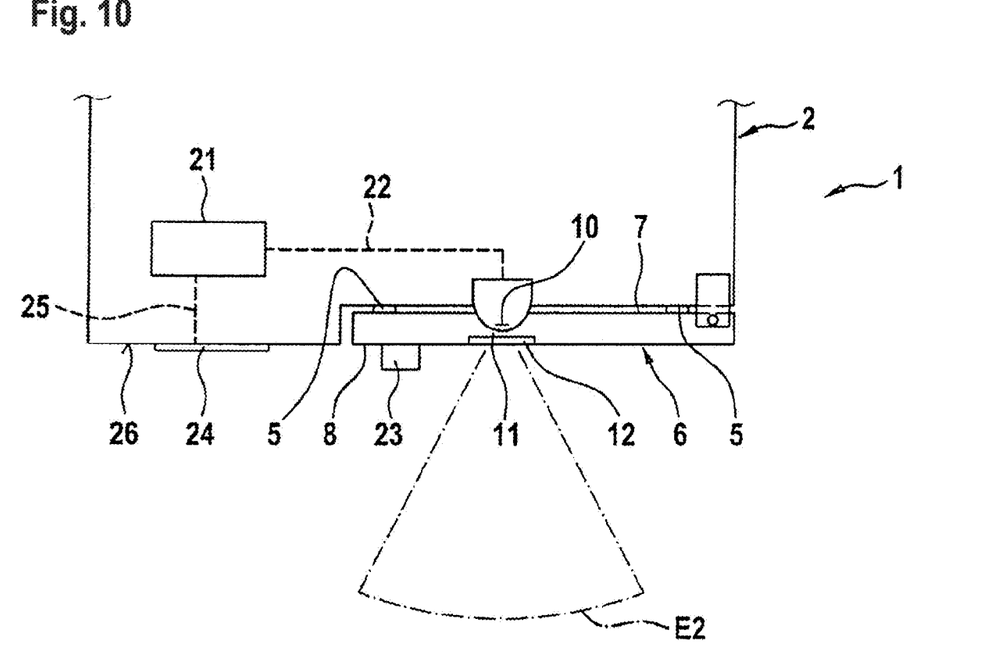
FIG. 10 shows a strongly schematically simplified schematic depiction of a top view of a ninth embodiment of the cooking appliance according to the disclosure.

The ninth embodiment of the cooking appliance 1 according to the disclosure according to FIG. 10 substantially serves for clarifying that the optoelectronic sensor 10, which is again arranged in the reception area 11 so as to be thermally protected by the door seal 5, can be in signal connection or data connection with a device controller or device regulation 21 via a suitable data transmission line 22. This control/regulation 21 can be operatively connected via a further data transmission line to a user interface 24 which can be attached on an appliance front side 26 of the housing 2. Of course, this connection of the sensor 10 to a control/regulation, which in turn is in data connection with a user interface, is also technically possible in all other previously described embodiments, which is respectively symbolized by a depiction of the user interface 24 in the previously described embodiments in FIGS. 1, 2, 7 and 9. However, as mentioned, this embodiment of FIG. 10 is also possible in the embodiments of FIGS. 3 to 6 and 9.

Figure 11:
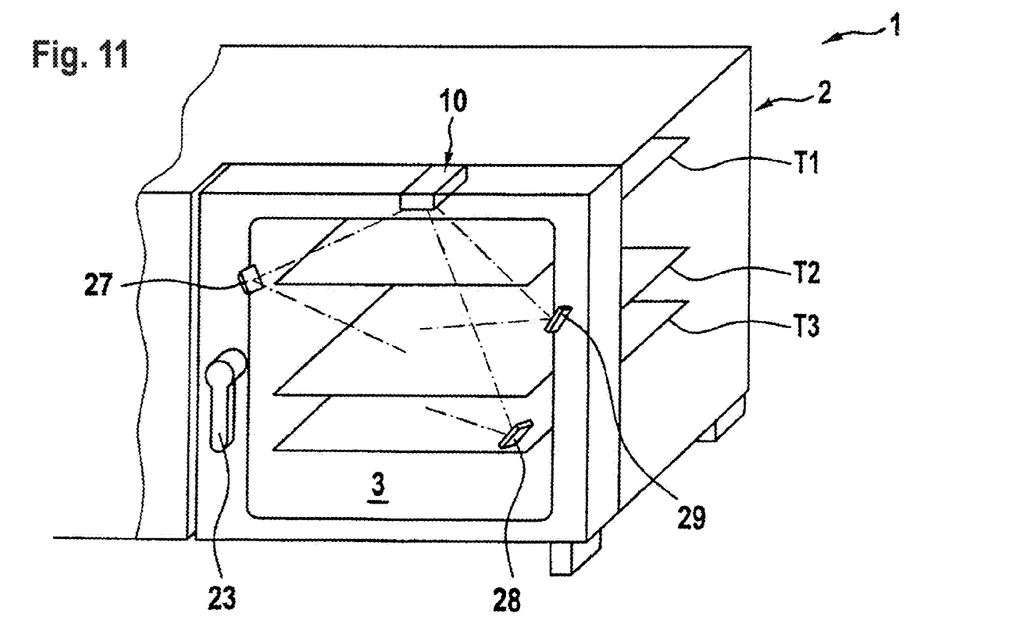
FIG. 11 shows a depiction of a tenth embodiment of the cooking appliance according to the disclosure corresponding to FIG. 1.

FIG. 11 shows a last embodiment of the cooking appliance 1 according to the disclosure, also in a strongly schematically simplified depiction. This depiction is merely supposed to illustrate that it is possible to provide one or a plurality of deflection mirrors 27, 28, 29 in the cooking chamber 3 in order to facilitate corresponding beam paths, as symbolized by the dot-dashed lines. Otherwise, the embodiment according to FIG. 11 can be one of the previously described embodiments according to FIGS. 1 to 10.

Figure 12:
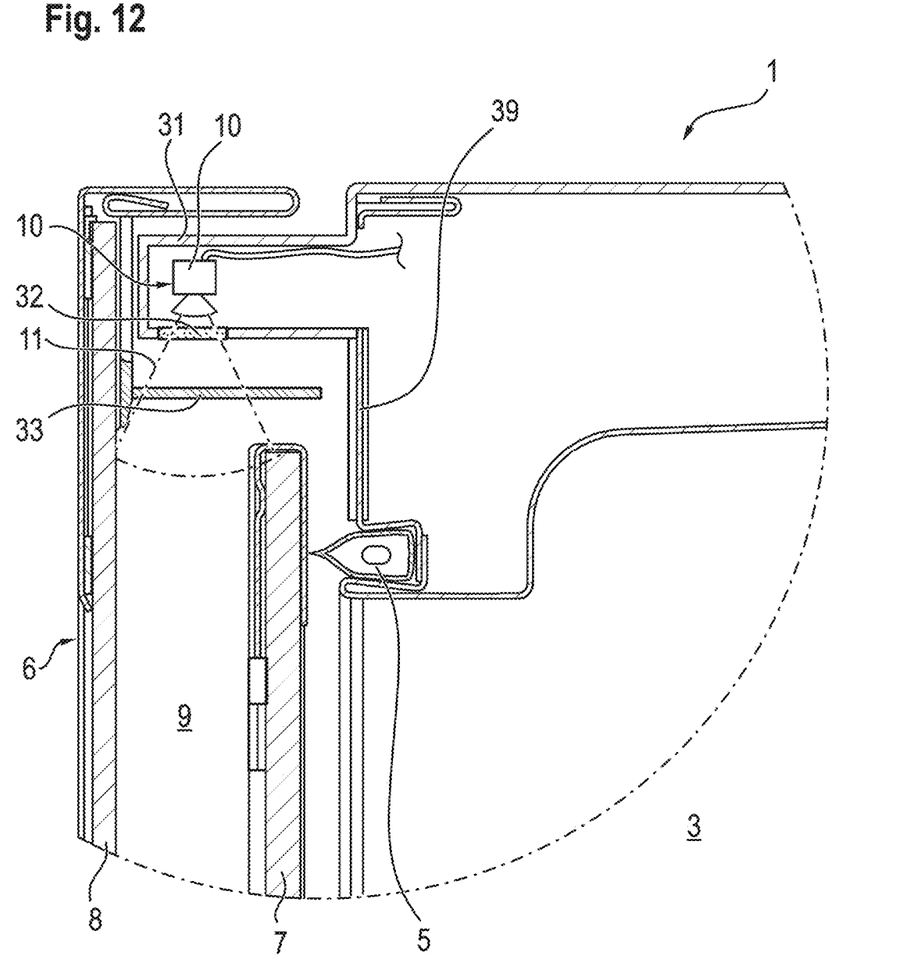
FIG. 12 shows a depiction of a part of a further embodiment of the cooking appliance according to the disclosure corresponding to FIG. 3.

FIG. 12, a further especially preferred embodiment of the cooking appliance 1 according to the disclosure is shown in a partial section. In this embodiment, the optical sensor 10 is arranged in a housing 31 that is affixed in the reception area 11. As illustrated in FIG. 12, this housing 31 can be provided with an inspection window 32 that is arranged opposite the optical sensor 10.

Figure 13:
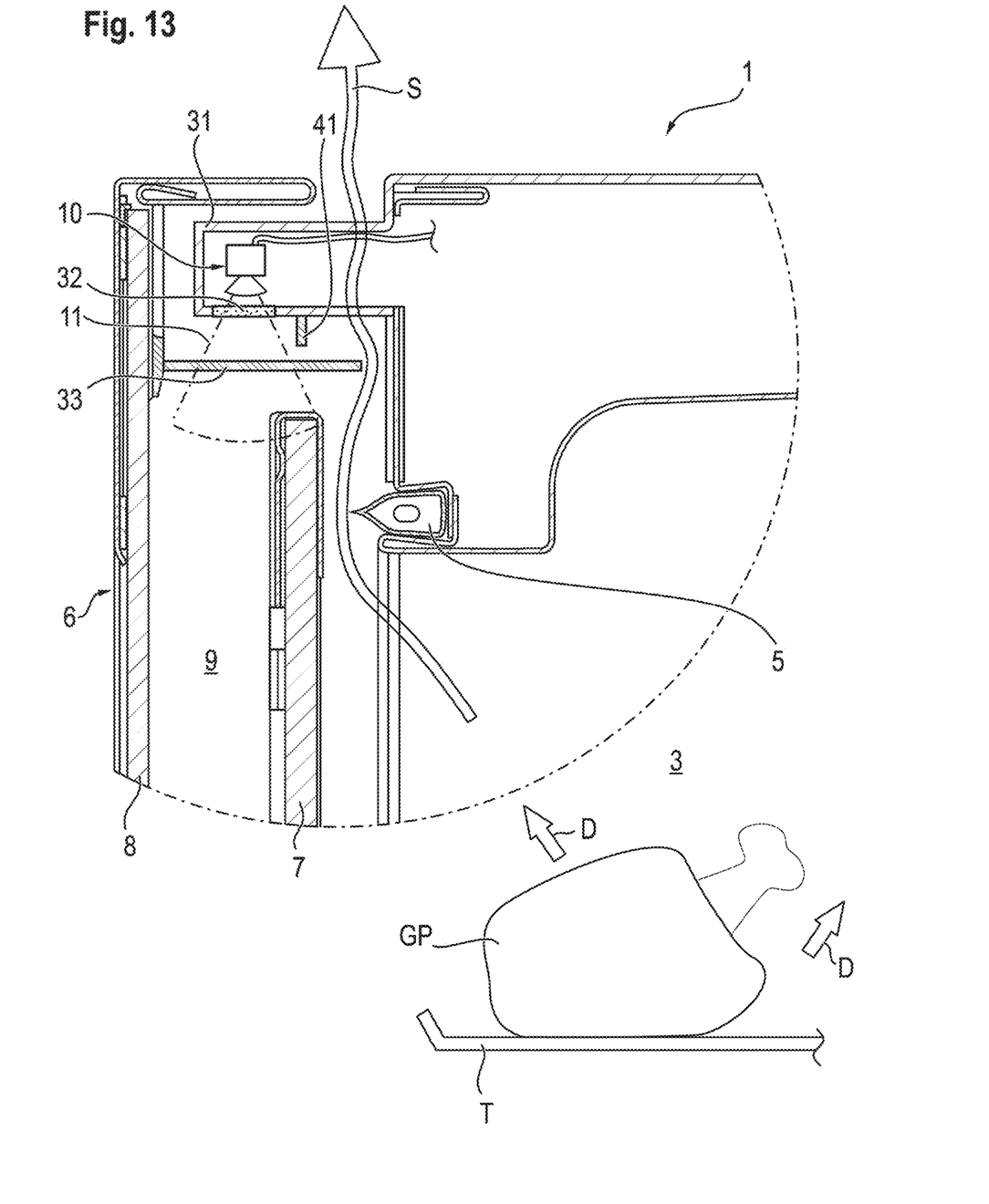
FIG. 13 shows a depiction of the cooking appliance corresponding to FIG. 12, with the cooking chart chamber door slightly opened.
Figure 16:
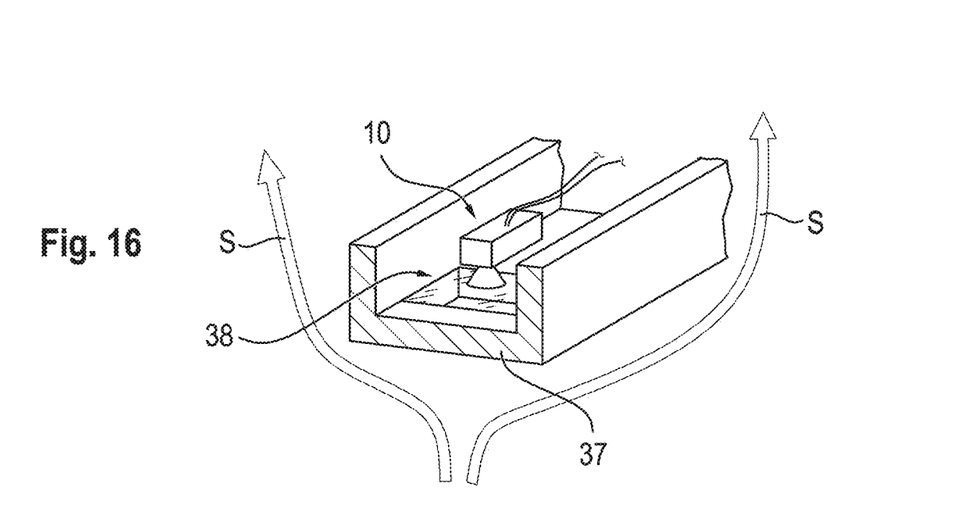

Further, a deflector plate 33 is arranged below the housing 31 in the reception area 11. This deflector plate (deflector sheet) can preferably the transparent, that is, it may for example be made of glass. The deflector plate 33 serves for preventing the optical sensor 10, in the exemplary case the inspection window 32, if it is provided, from getting dirty at the end of a cooking process when the cooking chamber door 6 is opened by creating a directed flow S (in this context, see also FIG. 16 illustrating the course of the flow S about a deflector appliance 37) of the vapor that is discharged from the cooking chamber 3, which can be seen in FIG. 13. FIG. 13 shows the cooking chamber door 6 in a slightly opened state, for example in an venting position in which the inner pane 7 lifts off from the door seal 5, so that it is possible for the flow S, which consists of air and vapor given off by the product GP to be cooked, to be guided past the inspection window 32 in a targeted manner, or, if no inspection window and no housing 31 is provided, to be guided past the optical sensor 10 in a targeted manner, so that it can be avoided that the optical sensor 10 gets dirty through the flow S or vapor S, for example through fat deposits. Further, FIG. 13 illustrates an additional diverter element 41 that is arranged at the housing 31 adjacent to the inspection window 32 and in the exemplary case projects from the respective housing wall of the housing 31 at a right angle. In this manner, it is possible to retain fat deposits F in an area above the inspection window 32, so that the inspection window 32 does not get dirty through such deposits.

Figure 14:
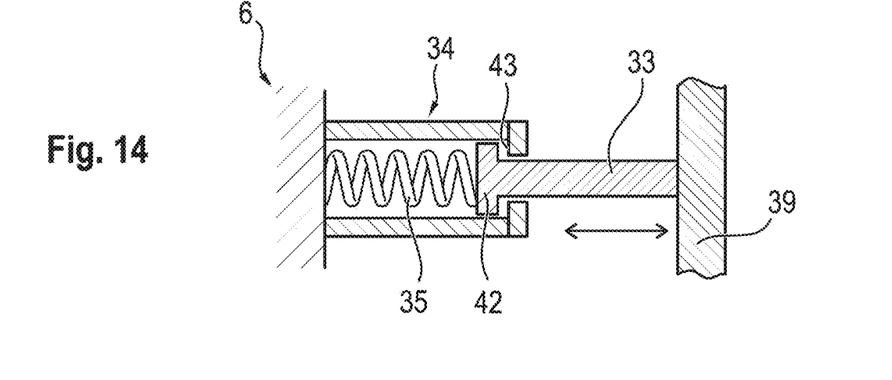
FIG. 14 to 16 show strongly schematically simplified schematic depictions of further particularly preferred embodiments of repelling or deflection appliances of the cooking appliance according to the disclosure for protecting a camera, an optical system or a sensor of the cooking appliance according to the disclosure.

FIG. 14 shows, in a strongly schematically simplified rendering, a further particularly preferred embodiment of the deflector plate 33, which in this case is biased by a compression spring 35, which, just like the deflector plate 33, is guided inside a guide 34, which may for example be embodied as a guide sleeve. In this manner, it is facilitated that, when the cooking chamber door 6 is slightly opened, as it is shown in FIG. 14, the spring 35 presses the deflector plate 33 in the direction towards an inner housing wall 39, so that the deflector plate 33 can abut at the housing wall 39 FIG. 14 further illustrates, in a schematically simplified manner, an end stop 42 that is arranged at the free end of the deflector plate 33 and is provided in the guide 34. This end stop 42 cooperates with an end stop or a counter stop 43 at the guide 34 and prevents the deflector plate 33 from slipping out of the guide 34.

Figure 15:
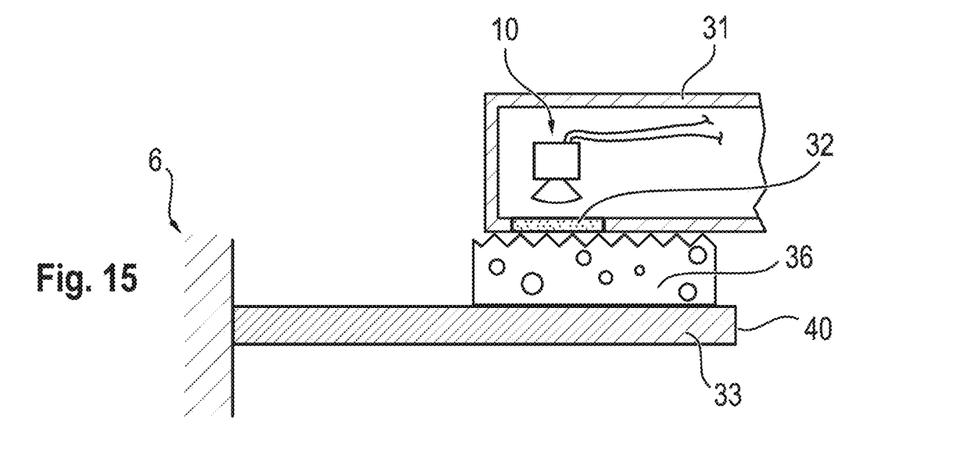

FIG. 15 shows an embodiment of the deflector plate 33 that is provided with a cleaning part 36 in its free end area 40, for example in the form of a cleaning pad. Since the cleaning part 36 is arranged adjacent to the free end area 40 of the deflector plate 33, the cleaning part 36 is arranged in the interior space of the housing 2 so far that the inspection window 32, or, if no inspection window is provided, the optical sensor 10 is not covered by the cleaning part 36 in the closed state of the cooking chamber door 6. However, when the cooking chamber door 6 is opened, as shown in FIG. 15, the cleaning part 36 moves past the inspection window 32 or, if no inspection window 32 is provided, moves past the sensor 10 in such a manner that either the inspection window 32 or the sensor 10 can be cleaned by the cleaning part 36.

FIG. 16 illustrates an embodiment of a deflector appliance 37 in the form of a U profile that has an interior area 38 in which the optical sensor 10 is at least partially arranged. Of course, the deflector appliance 37 also consists either of a transparent material or is provided with an inspection window, such as the inspection window 32.

In addition to the above written description of the disclosure, the depiction of the disclosure in FIG. 1 to 16 is herewith explicitly referred to for an additional disclosure of the disclosure. Further, for an additional disclosure of the present disclosure, the disclosure of EP 2 638 325 B1 as well as DE 10 2008 031 378 are included in their entirety in the content of the disclosure of the present disclosure.

PARTS LIST

1 cooking appliance, in particular commercial cooking appliance
2 housing
3 cooking chamber
4 cooking chamber opening
5 door seal
6 cooking chamber door
7 inner pane
8 outer pane
9 cooking chamber door interior space
10, 10' optical sensor, in particular camera
10A, 10A' sensor housing
10B, 10B' sensor eye (optical system, optical lens, camera lens)/endoscopy systems/optical systems
10C, 10C' optical cable/fiber optic table/image transfer element
10D, 10D' coupling optics
10E prism/deflection mirror
11 reception area/positioning area
12 inspection window
13 housing projection
14 housing front face
15 air gap
16, 17, 18 optical eyes (coupling-in points)
19 prism
19A. 19B coupling-out points
20 deflection mirror
21 device controller/device regulation
22 data transmission line
23 cooking chamber door handle
24 user interface
25 data transmission line
26 appliance front side
27, 28, 29 deflection mirror
30 door hinge
31 housing
32 inspection window
33 deflector plate, deflector sheet, in particular transparent
34 guide, guide sleeve
35 spring
36 cleaning part, cleaning pad
37 deflector appliance in the form of a U profile
38 interior area
39 inner housing wall
40 free end area of 33
41 additional diverter element
42 end stop at the deflector plate 33
43 stop plate at the guide 34
S vapor/flow
T1-T3 support for item to be cooked
GP, GP2, GP2, GP3 item to be cooked, product to be cooked
E1, E2, E3 detection areas

What is claimed is:

1. A cooking appliance comprising:
a cooking appliance housing,
a cooking chamber disposed in the cooking appliance housing having a cooking chamber opening;
a cooking chamber door that can be opened and closed to allow access to the cooking chamber;
a circumferential door seal that surrounds the cooking chamber opening and is disposed on an inner side of the cooking chamber door or on an area of the housing adjacent to the cooking chamber opening,
wherein the cooking chamber door has an inner pane that is adjacent to the cooking chamber, wherein, in the closed state of the cooking chamber door, the inner pane abuts the circumferential door seal, and wherein the cooking chamber door has an outer pane that is disposed at a distance apart from the inner pane, and wherein the outer pane together with the inner pane delimits a cooking chamber door interior space,
an optoelectronic sensor and
an optoelectronic sensor housing,
wherein the optoelectronic sensor is disposed in or connected to the optoelectronic sensor housing,
wherein the optoelectronic sensor housing is attached to the cooking appliance housing,
wherein, in the closed state of the cooking chamber door, the optoelectronic sensor is disposed in a reception area of the cooking chamber door interior space that is configured to accept the optical sensor and is disposed outside the door seal, and
wherein, in the open state of the cooking chamber door, the optoelectronic sensor is removed from the reception area of the cooking chamber door interior space.

2. The cooking appliance according to claim 1, wherein the reception area is provided with an inspection window.

3. The cooking appliance according to claim 1, wherein the optoelectronic sensor housing is attached to a front face of the cooking appliance outside the door seal and is disposed away from the front face of the cooking appliance.

4. The cooking appliance according to claim 3, wherein, when the cooking chamber door is closed, the optoelectronic sensor housing is sealed into the reception area.

5. The cooking appliance according to claim 1, wherein the optoelectronic sensor further comprises a sensor housing and a sensor eye, wherein the sensor eye is connected to the sensor housing via an optical cable, and wherein the sensor eye is disposed in the reception area.

6. The cooking appliance according to claim 5, wherein the optoelectronic sensor has two sensor housings disposed in the optoelectronic sensor housing and two sensor eyes disposed in the reception area, wherein each of the two sensor housings is coupled with, respectively, one optical cable reaching to an air gap between the optoelectronic sensor housing and the reception area.

7. The cooking appliance according to claim 3, wherein the inner pane is provided with a plurality of optical eyes.

8. The cooking appliance according to claim 3, further comprising a prism disposed in the cooking chamber door interior space.

9. The cooking appliance according to claim 3, further comprising a deflection mirror disposed in the cooking chamber door interior space.

10. The cooking appliance according to claim 1, wherein the optoelectronic sensor housing includes a data transmission line connected to a device controller/device regulation, wherein the device controller/device regulation is operatively connected to the optoelectronic sensor via the data transmission line.

11. The cooking appliance according to claim 10, wherein the device controller/device regulation is operatively connected via a further data transmission line to a user interface disposed at a front side of the cooking appliance housing.

12. The cooking appliance according to claim 9, wherein the deflection mirror comprises a plurality of deflection mirrors disposed in the cooking chamber door or in the cooking chamber.

13. The cooking appliance according to claim 3, wherein the optoelectronic sensor comprises a camera and a camera lens.

14. The cooking appliance according to claim 3, wherein the optoelectronic sensor is disposed in a second optoelectronic sensor housing affixed in the reception area.

15. The cooking appliance according to claim 14, wherein the second optoelectronic sensor housing is provided with an inspection window.

16. The cooking appliance according to claim 3, further comprising a deflector appliance that is disposed in the reception area adjacent to the optoelectronic sensor.

17. The cooking appliance according to claim 16, wherein the deflector appliance is configured as a deflector plate that is spring-loaded.

18. The cooking appliance according to claim 16, wherein the deflector appliance is provided with a cleaning part.

19. The cooking appliance according to claim 16, wherein the deflector appliance is configured as a "U" profile.

* * * * *